(12) United States Patent
Schellaars

(10) Patent No.: US 12,304,632 B2
(45) Date of Patent: May 20, 2025

(54) TANK ASSEMBLY AND HELICOPTER

(71) Applicant: Helitak Fire Fighting Equipment Pty Ltd, Lake MacDonald (AU)

(72) Inventor: Jason Schellaars, Lake MacDonald (AU)

(73) Assignee: Helitak Fire Fighting Equipment Pty Ltd, Lake MacDonald (AU)

( * ) Notice: Subject to any disclaimer, the term of this patent is extended or adjusted under 35 U.S.C. 154(b) by 0 days.

(21) Appl. No.: 17/864,286

(22) Filed: Jul. 13, 2022

(65) Prior Publication Data

US 2022/0355931 A1    Nov. 10, 2022

Related U.S. Application Data

(63) Continuation of application No. PCT/AU2020/050612, filed on Jun. 17, 2020.

(30) Foreign Application Priority Data

Jan. 17, 2020  (AU) ................ 2020900130

(51) Int. Cl.
  *B64D 1/22*   (2006.01)
  *A62C 3/02*   (2006.01)
  (Continued)

(52) U.S. Cl.
  CPC ........... *B64D 1/22* (2013.01); *A62C 3/0235* (2013.01); *B64D 1/16* (2013.01); *B65D 88/24* (2013.01);
  (Continued)

(58) Field of Classification Search
  CPC ......... B64D 1/16; B64D 37/12; B64D 37/22; B64D 37/26; A62C 3/0228; A62C 3/0235;
  (Continued)

(56) References Cited

U.S. PATENT DOCUMENTS 2,973,923 A * 3/1961 Sznycer ............... B64D 1/22
                                                244/17.11
3,714,987 A * 2/1973 Mattson .............. B64D 1/16
                                                169/53

(Continued)

FOREIGN PATENT DOCUMENTS

WO        9117084     11/1991
WO    WO 00/29287  *  5/2000    ............... B64D 1/16

(Continued)

OTHER PUBLICATIONS

Gabbert, Bill. "Collapsible Belly Tank for a Blackhawk." Fire Aviation, May 1, 2013, fireaviation.com/2013/05/01/collapsible-belly-tank-for-a-blackhawk/. (Year: 2013).*

(Continued)

*Primary Examiner* — Richard Green
*Assistant Examiner* — Ka Chun Leung
(74) *Attorney, Agent, or Firm* — William A. English; Vista IP Law Group LLP

(57) ABSTRACT

A tank assembly for a helicopter is provided. The tank assembly includes a retractable tank for storing liquid or other substances. The retractable tank includes an upper frame structure. The tank assembly further includes an attachment mechanism attached to the upper frame structure and configured to engage a main rotor transmission of the helicopter to suspend therefrom. A helicopter including a fuselage, a main rotor transmission, and a tank assembly is also provided.

18 Claims, 17 Drawing Sheets

(51) Int. Cl.
  *B64D 1/16* (2006.01)
  *B65D 88/24* (2006.01)
  *B65D 90/00* (2006.01)
  *B65D 90/62* (2006.01)

(52) U.S. Cl.
  CPC ....... *B65D 90/0033* (2013.01); *B65D 90/623* (2013.01); *B65D 2590/00* (2013.01)

(58) Field of Classification Search
  CPC .. B60K 15/0634; B60K 15/067; B60K 15/07; B60K 15/073
  See application file for complete search history.

(56) References Cited

U.S. PATENT DOCUMENTS

| | | | | |
|---|---|---|---|---|
| 3,823,901 | A | * | 7/1974 | Holmes .................... B64D 1/02 244/118.1 |
| 5,417,304 | A | | 5/1995 | Kurtgis |
| 2001/0054669 | A1 | * | 12/2001 | Ramage ............... A62C 3/0228 244/136 |
| 2012/0018569 | A1 | * | 1/2012 | Toni ........................ B64C 1/061 244/17.11 |
| 2016/0229535 | A1 | * | 8/2016 | Doten ..................... B64D 1/16 |
| 2018/0291616 | A1 | * | 10/2018 | Dicaire ................... E04B 1/388 |

FOREIGN PATENT DOCUMENTS

| | | |
|---|---|---|
| WO | 2010138229 A2 | 12/2010 |
| WO | 2011154325 A1 | 12/2011 |
| WO | 2020124129 A1 | 6/2020 |

OTHER PUBLICATIONS

"The Rugged and Economic H215 Ready for the U.S. Market." Airbus Helicopters, Mar. 1, 2016, www.airbushelicopters.com/website/docs_wsw/RUB_151/press_1925/2016-03-01_HAI_H215_US_Demo_Tour_EN.pdf. (Year: 2016).*

European Patent Office Examiner, Extended European Search Report for EP Application No. 20913097.0, Feb. 5, 2024, 8 pages.

* cited by examiner

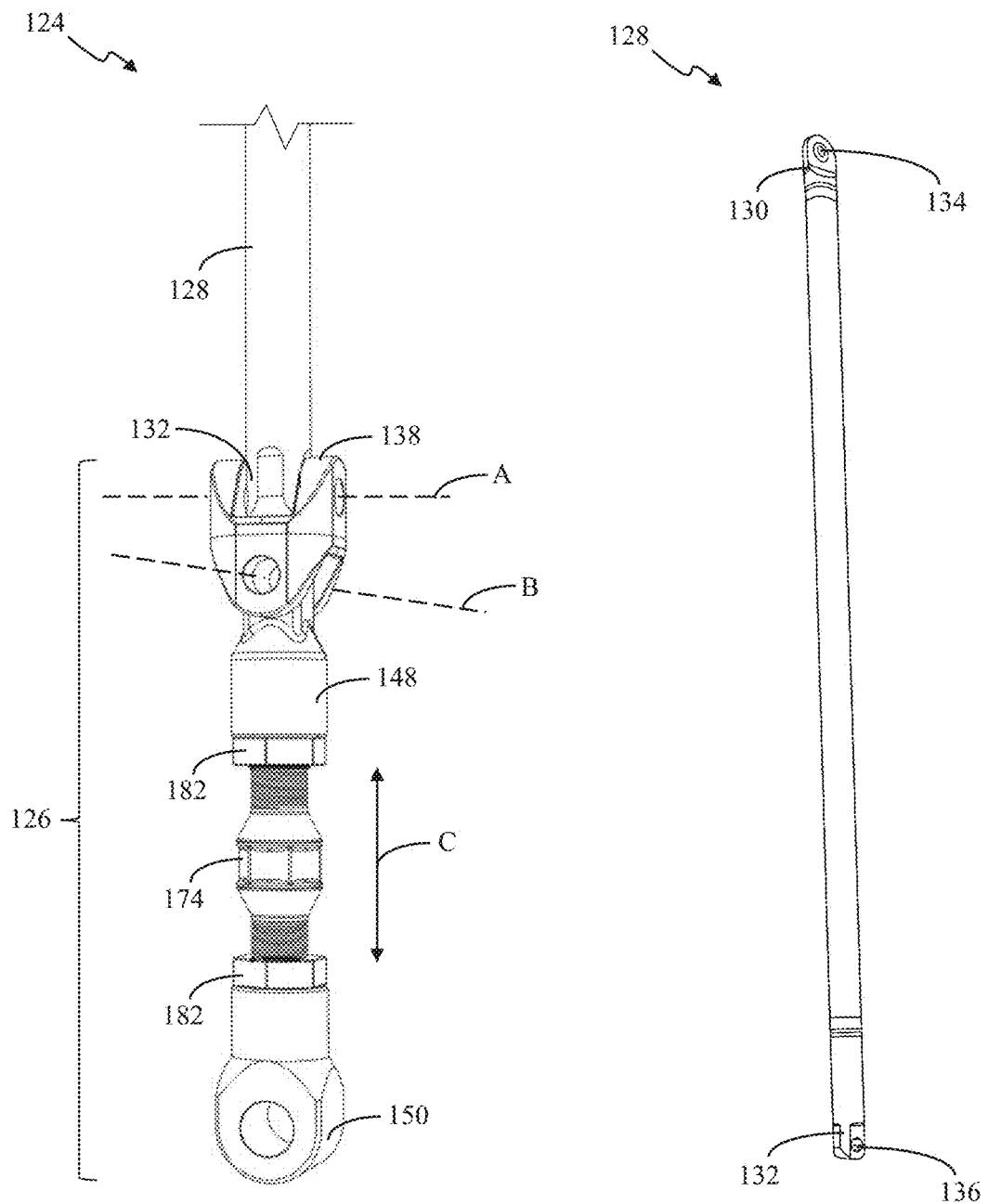
*Fig. 4*  *Fig. 5*

TANK ASSEMBLY AND HELICOPTER

RELATED APPLICATION DATA

The present application is a continuation of International Application No. PCT/AU2020/050612, filed Jun. 17, 2020, which claims benefit of and priority to Australian Application No. 2020900130, filed Jan. 17, 2020, the entire disclosures of which are expressly incorporated by reference herein.

TECHNICAL FIELD

The present disclosure relates to a tank assembly for a helicopter, and more particularly, a tank assembly comprising a retractable tank for storing liquid or other substances. The present disclosure also relates to a helicopter with a tank assembly attached thereto, the tank assembly comprising a retractable tank for storing liquid or other substances.

BACKGROUND

The Super Puma helicopter (for example, Eurocopter AS332, and Airbus H215 and H225) is a twin-engine multi-purpose utility helicopter that has, in recent times, become popular for use in various civilian operations including aerial firefighting, search and rescue, and passenger and cargo transportation due to their large cabin compartment, high fuel capacity, flexible configuration and maneuverability.

Currently, Super Puma helicopters' firefighting capabilities are in the form of an underslung long-line bucket system. The bucket system typically comprises a bucket containing fire retardant material or water that is suspended from the Super Puma helicopter via one or more long cables. However, a disadvantage of the bucket system is that the long cables of the bucket system often limit the maneuverability of the Super Puma helicopter. The long cables of the bucket system can also make it quite difficult and cumbersome for the pilot to accurately release water or fire-retardant material on a fire, as the pilot would be required to take account of the trajectory of the bucket during flight. A further disadvantage is that the long cables of the bucket system can pose a potential risk of entanglement with trees and other objects during flight. Moreover, the bucket system has limited capacity for holding fire retardant material or water, which is typically well below the maximum lifting capacity of the Super Puma helicopter.

Object

It is an object of the present disclosure to substantially overcome or ameliorate one or more of the above disadvantages, or at least provide a useful alternative.

SUMMARY

In accordance with an aspect of the present disclosure, there is provided a tank assembly for a helicopter, the tank assembly comprising:
a retractable tank for storing liquid or other substances, the retractable tank comprising an upper frame structure; and
an attachment mechanism attached to the upper frame structure and configured to engage a main rotor transmission of the helicopter to suspend therefrom.

The attachment mechanism may comprise a linking assembly attached to the upper frame structure, and a rod pivotably attached to the linking assembly and extending upwardly therefrom to an upper end portion. The upper end portion of the rod may be configured to attach to the main rotor transmission of the helicopter.

The linking assembly may comprise a gimbal head defining at least one aperture. The rod may have a lower end portion defining at least one aperture.

The tank assembly may further comprise a fastener for securing the gimbal head to the rod. The aperture of the gimbal head and the aperture of the lower end portion of the rod may be aligned and fixed by the fastener.

The tank assembly may further comprise one or more stabilisation mounts attached to the upper frame structure. The stabilisation mounts may be configured to attach to the underside of the fuselage of the helicopter.

The upper frame structure may have a forward end portion and a rearward end portion. The one or more stabilisation mounts may comprise two forward mounts attached to the forward end portion and two rearward mounts attached to the rearward end portion.

The upper frame structure may have a centre portion between the forward and rearward end portions. The attachment mechanism may be attached to the centre portion.

The retractable tank may further comprise a moveable lower frame structure and a flexible bag connected to the upper and lower frame structures. The lower frame structure may be moveable between a first retracted position in which the lower frame structure is substantially within or adjacent the upper frame structure, and a second extended position in which the lower frame structure is spaced from the upper frame structure such that a volume is defined within the flexible bag for storing the liquid or other substances.

The lower frame structure may be biased to the first retracted position and may move towards the second extended position in response to the amount of liquid or other substance in the volume of the flexible bag.

The lower frame structure may be biased to the first retracted position by a retraction system engaged with the upper and lower frame structures.

In accordance with another aspect of the present disclosure, there is provided a helicopter comprising:
a fuselage having an underside;
a main rotor transmission; and
a tank assembly comprising:
   a retractable tank for storing liquid or other substances, the retractable tank comprising an upper frame structure; and
   an attachment mechanism attached to the upper frame structure and engaged with the main rotor transmission to suspend therefrom.

The attachment mechanism may comprise a linking assembly attached to the upper frame structure, and a rod pivotably attached to the linking assembly and extending upwardly therefrom to an upper end portion. The upper end portion of the rod may be attached to the main rotor transmission of the helicopter.

The linking assembly may comprise a gimbal head defining at least one aperture. The rod may have a lower end portion defining at least one aperture.

The tank assembly further comprises a fastener for securing the gimbal head to the rod. The aperture of the gimbal head and the aperture of the lower end portion of the rod may be aligned and fixed by the fastener.

The tank assembly may further comprise one or more stabilisation mounts attached to the upper frame structure and the underside of the fuselage.

The upper frame structure may have a forward end portion and a rearward end portion. The one or more stabilisation mounts may comprise two forward mounts attached to the forward end portion and two rearward mounts attached to the rearward end portion.

The upper frame structure may have a centre portion between the forward and rearward end portions. The attachment mechanism may be attached to the centre portion.

The main rotor transmission may define an aperture, and the upper end portion of the rod may define an aperture.

The helicopter may further comprise a fastener for securing the rod to the main rotor transmission. The aperture of the upper end portion of the rod and the aperture of the main rotor transmission may be aligned and secured by the fastener.

The helicopter may be a Super Puma helicopter.

The retractable tank may further comprise a moveable lower frame structure and a flexible bag connected to the upper and lower frame structures. The lower frame structure may be moveable between a first retracted position in which the lower frame structure is substantially within or adjacent the upper frame structure, and a second extended position in which the lower frame structure is spaced from the upper frame structure such that a volume is defined within the flexible bag for storing liquid or other substances.

The lower frame structure may be biased to the first retracted position and may move towards the second extended position in response to the amount of liquid or other substance in the volume of the flexible bag.

The lower frame structure may be biased to the first retracted position by a retraction system engaged with the upper and lower frame structures.

BRIEF DESCRIPTION OF DRAWINGS

Embodiments of the present disclosure will now be described hereinafter, by way of examples only, with reference to the accompanying drawings, in which:

FIG. 4 is a perspective view of an attachment mechanism of the tank assembly of FIG. 1;

FIG. 5 is a perspective view of a rod of the attachment mechanism of FIG. 4;

DESCRIPTION OF EMBODIMENTS

Figure 1:
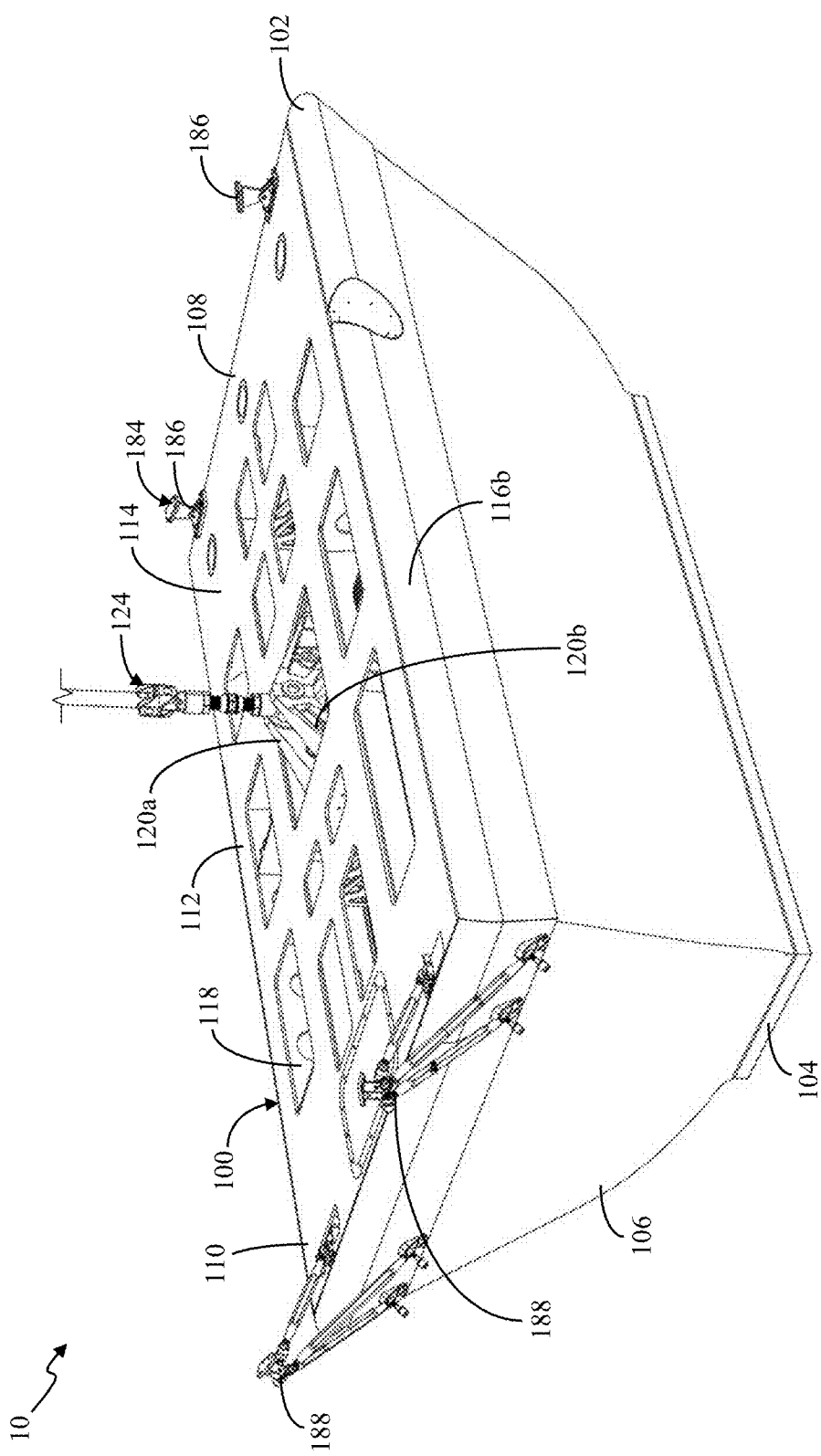
FIG. 1 is a perspective view of an embodiment of a tank assembly, with a lower frame structure of the tank assembly being in a second extended position.
Figure 2:
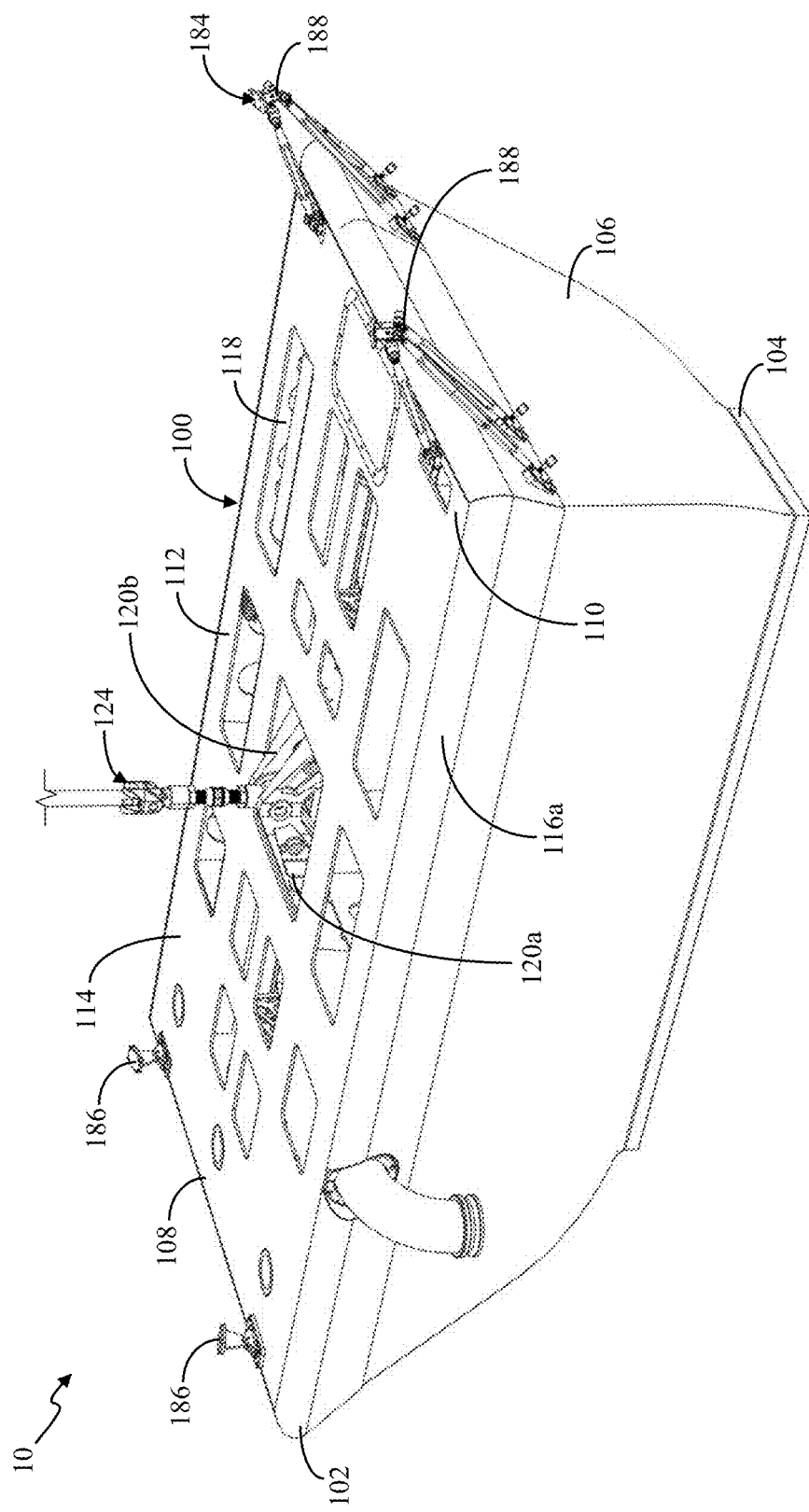
FIG. 2 is another perspective view of the tank assembly of FIG. 1.
Figure 3:
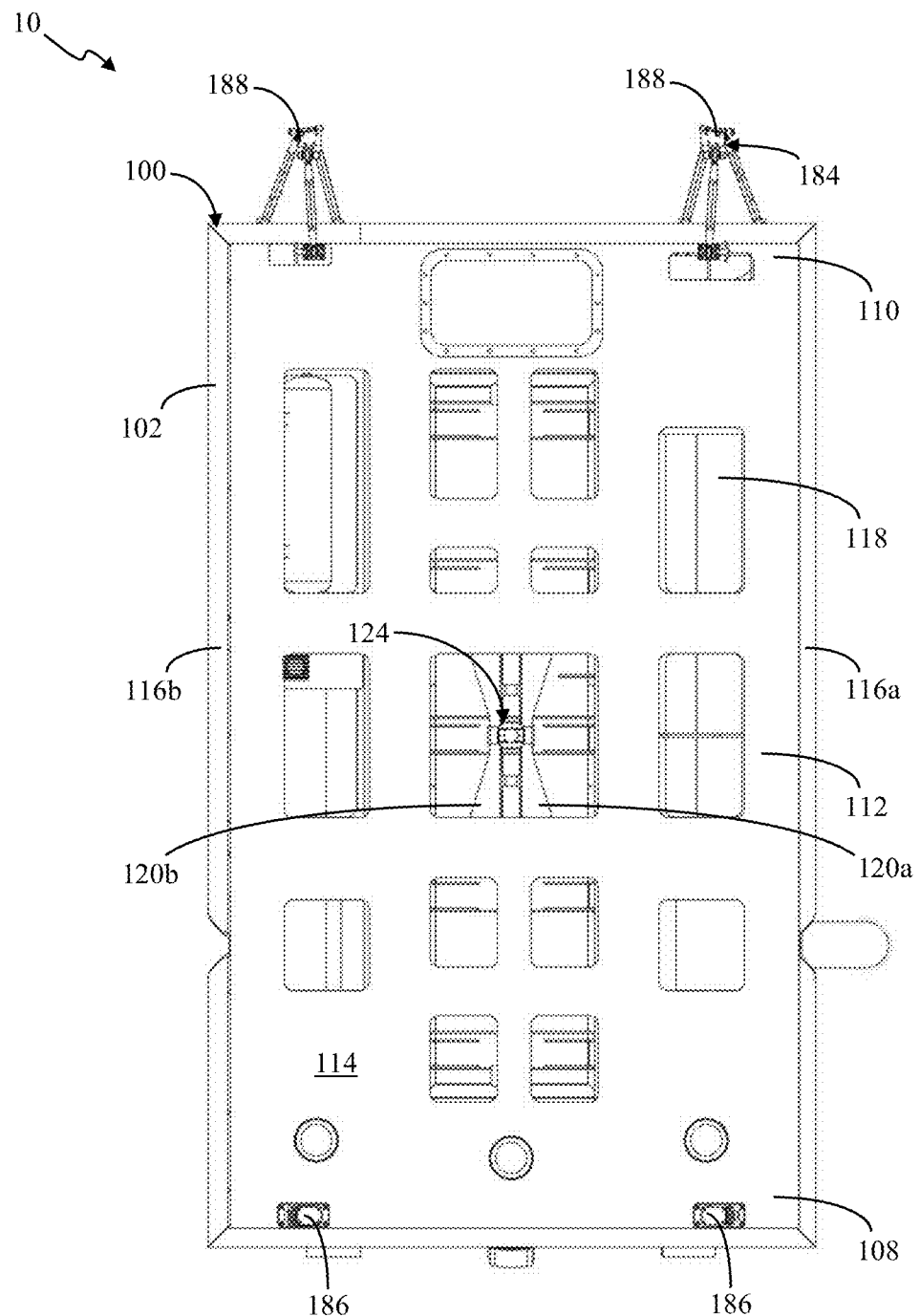
FIG. 3 is a top view of the tank assembly of FIG. 1.
Figure 9:
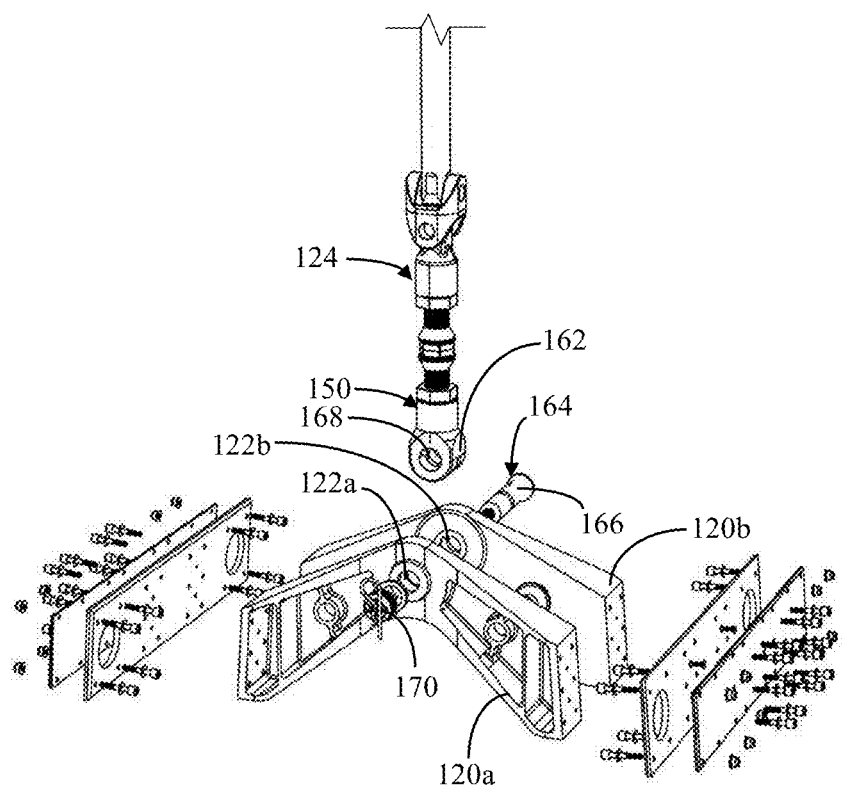
FIG. 9 is an exploded view of the attachment mechanism of FIG. 4 and attachment members of the tank assembly of FIG. 1.

FIGS. 1 to 3 show an embodiment of a tank assembly 10 for a helicopter 20. The tank assembly 10 comprises a retractable tank 100 for storing liquid or other substances such as water or fire-retardant material, for example. The retractable tank 100 comprises an upper frame structure 102, a moveable lower frame structure 104 and a flexible bag 106, in the form of a funnel-shaped bellows, which is connected to the upper and lower frame structures 102, 104. The upper frame structure 102 has a forward end portion 108, a rearward end portion 110, a centre portion 112 between the forward and rearward end portions 108, 110, an upwardly-facing surface 114 and two opposed side surfaces 116a, 116b. The upwardly-facing surface 114 defines a plurality of openings 118. Further, the upper frame structure 102 has two attachment members 120a, 120b extending upwardly from the upwardly-facing surface 114. Each of the attachment members 120a, 120b is in the form of arch beams defining an aperture 122a, 122b, as best shown in FIG. 9. The upper and lower frame structures 102, 104 are formed from carbon fibre material or the like.

The tank assembly 10 also comprises an attachment mechanism 124 attached to the upper frame structure 102 and configured to engage a main rotor transmission 404 of the helicopter 20. The attachment mechanism 124 comprises a linking assembly 126 and a rod 128 pivotably attached to the linking assembly 126 and extending upwardly therefrom. With reference to FIG. 5, the rod 128 has an upper end portion 130 and a lower end portion 132. Each of the upper and lower end portions 130, 132 defines an aperture 134, 136. The upper end portion 130 is configured to attach to the main rotor transmission 404 of the helicopter 20 for fixed attachment.

Figure 6:
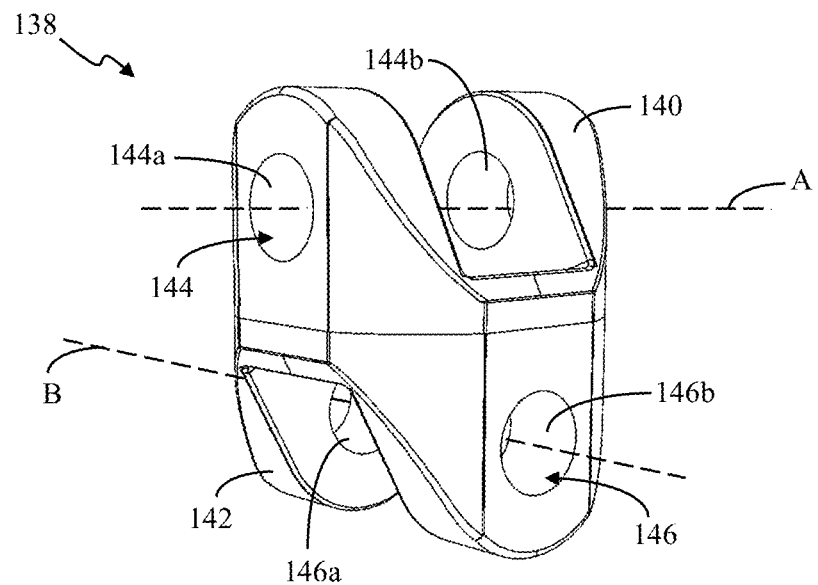
FIG. 6 is a perspective view of a gimbal head of a linking assembly of the attachment mechanism of FIG. 4.

With reference to FIGS. 4 and 6, the linking assembly 126 comprises a gimbal head 138 with an upper gimbal portion 140 and a lower gimbal portion 142. Each of the upper and lower gimbal portions 140, 142 define at least one aperture 144, 146. In this embodiment, each of the upper and lower gimbal portions 140, 142 are in the form of a clevis with two opposed apertures 144a, 144b, 146a, 146b. The lower end portion 132 of the rod 128 is fixed to the upper gimbal portion 140 by a fastener (not shown). In this embodiment, the fastener is in the form of a self-locking pin that extends through each of the apertures 144a 144b of the upper gimbal 140 portion and the aperture 136 of the lower end portion 132 of the rod 128, thereby fixedly attaching the gimbal head 138 to the rod 128. Engagement of the connecting pin and the aperture 136 of the lower end portion 132 of the rod 128 also allows the rod 128 to rotate about an axis A.

Figure 7:
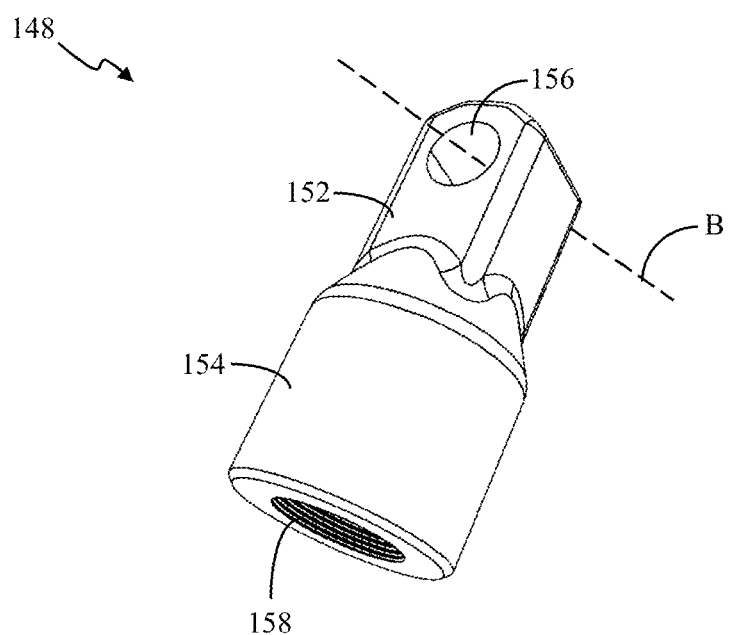
FIG. 7 is a perspective view of a neck connector of a linking assembly of the attachment mechanism of FIG. 4.

The linking assembly 126 also comprises a neck connector 148 and a tail connector 150. With reference to FIG. 7, the neck connector 148 has an upper neck connector portion 152 and a lower neck connector portion 154. The upper neck connector portion 152 fixed to the lower gimbal portion 142 by a fastener (not shown). In this embodiment, the fastener is in the form of a self-locking pin that extends through each of the apertures 146a, 146b of the lower gimbal portion 142 and an aperture 156 defined by the upper neck connector portion 152, thereby fixedly attaching the neck connector 148 to the gimbal head 138. Engagement of the connecting pin and the aperture 156 of the upper neck connector portion 154 allows the neck connector 148 to rotate about an axis B. In this embodiment, the axis A is perpendicular to the axis B. The lower neck connector portion 154 has an internally threaded recess 158.

Figure 8:
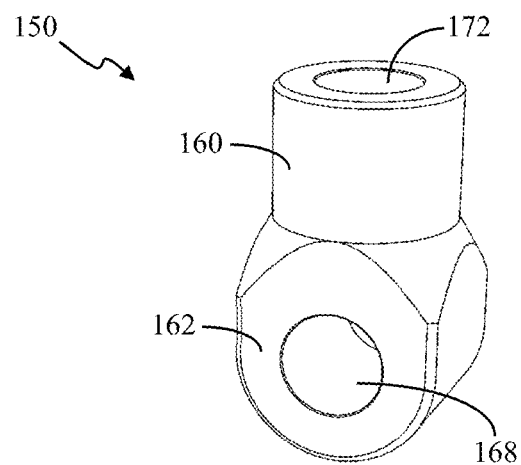
FIG. 8 is a perspective view of a tail connector of a linking assembly of the attachment mechanism of FIG. 4.

The tail connector 150 has an upper tail connector portion 160 and a lower tail connector portion 162, as shown in FIG. 8. The lower tail connector portion 162 is fixed to the attachment members 120a, 120b by a fastener 164. In this embodiment, and with reference to FIG. 9, the fastener 164 comprises a connecting pin 166 that extends through each of the apertures 122a, 122b of the attachment members 120a, 120b and an aperture 168 defined by the lower tail connector portion 162, and a locking mechanism 170 that engages with the connecting pin 166 to secure the lower tail connector portion 162 to the attachment members 120a, 120b. The upper tail connector portion 160 has an internally threaded recess 172.

Figure 10:
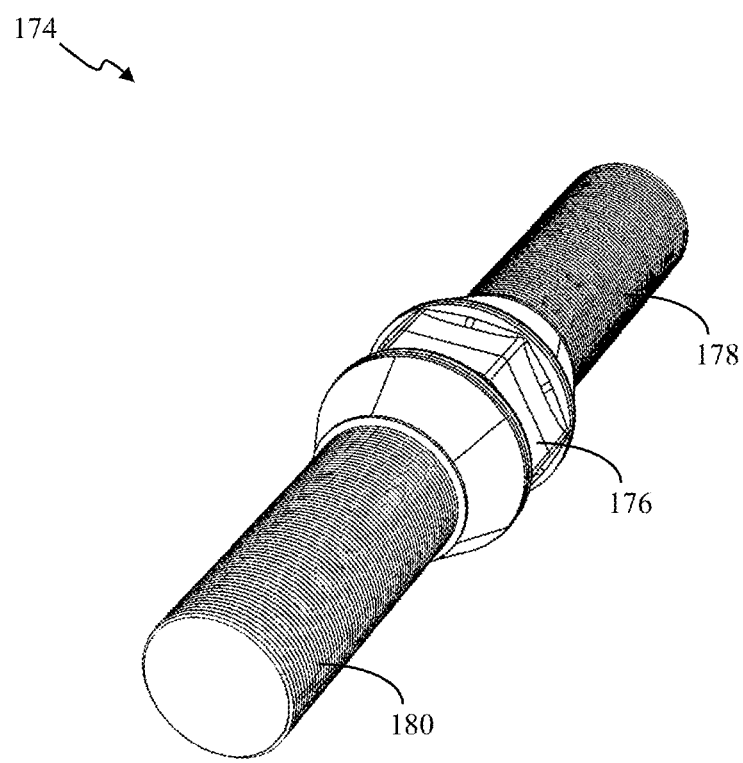
FIG. 10 is a perspective view of an adjustment mechanism of a linking assembly of the attachment mechanism of FIG. 4.

The linking assembly 126 further comprises an adjustment mechanism 174 attached to the neck and tail connectors 148, 150. As shown in FIG. 10, the adjustment mechanism 174 is in the form of a jack screw turnbuckle with a rotatable body 176, a left-hand-threaded portion 178 and a right-hand-threaded portion 180. The left-hand-threaded portion 178 is threadingly received in the internally threaded recess 158 of the lower neck connector portion 154. Similarly, the right-hand-thread portion 180 is threadingly received in the internally threaded recess 172 of the upper tail connector portion 160. A user can adjust the distance C (FIG. 4) between the neck and tail connectors 148, 150 by manipulating the rotatable body 176. Further, one or more nuts 182 is threaded against the neck and tail connectors 148, 150 to fix the distance C.

The attachment members 120a, 120b and the attachment mechanism 124 are formed from aluminium such as 6061-T6 aluminium, for example, or the like.

Figure 11:
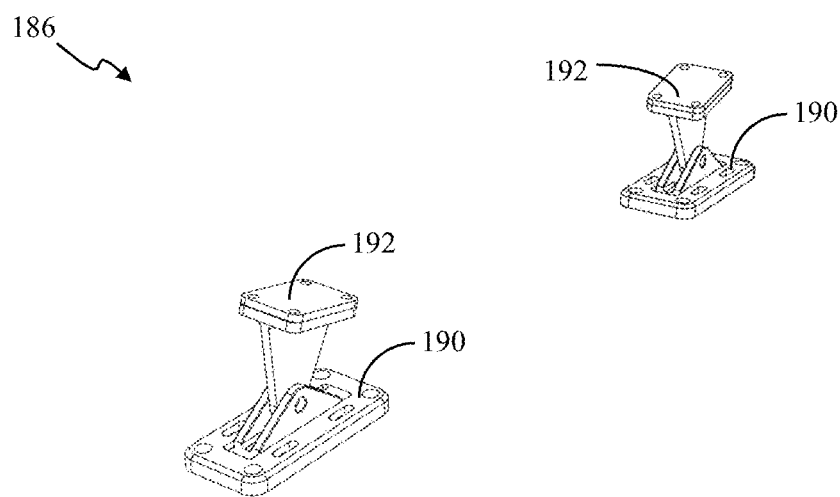
FIG. 11 is a perspective view of forward mounts of the tank assembly of FIG. 1.
Figure 12:
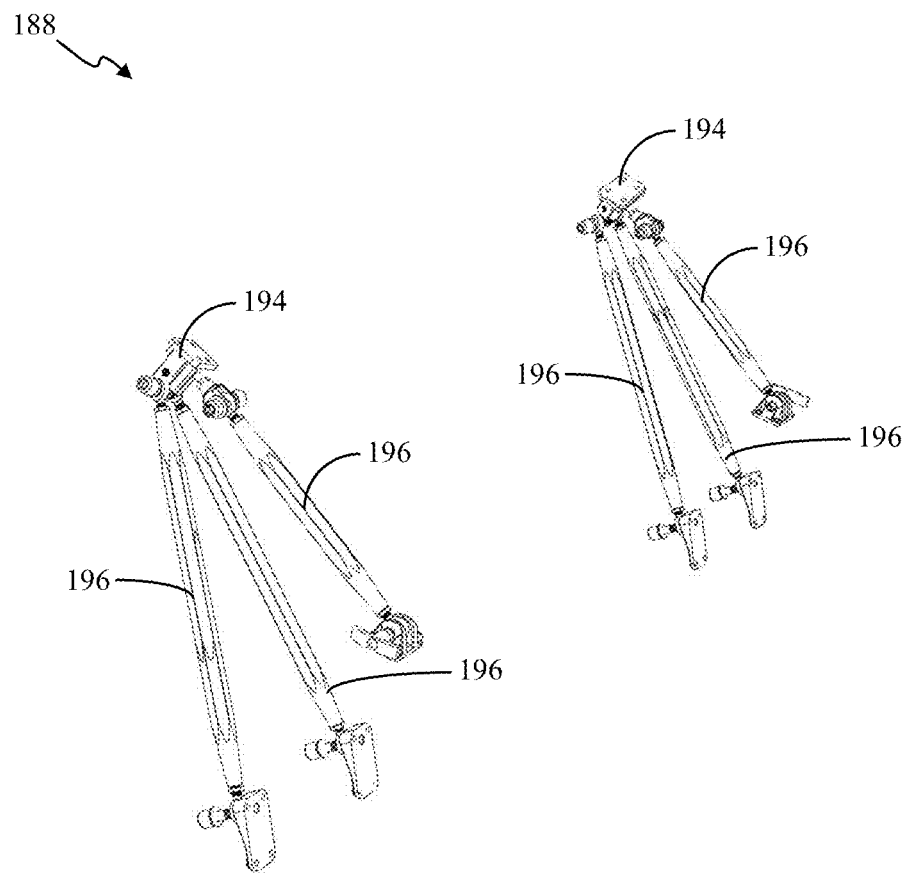
FIG. 12 is a perspective view of rearward mounts of the tank assembly of FIG. 1.

The tank assembly 10 further comprises one or more stabilisation mounts 184 configured to attach to the underside 402 of the fuselage 400 of the helicopter 20. In this embodiment, the tank assembly 10 comprises two forward mounts 186 attached to the forward end portion 108 of the upper frame structure 102, and two rearward mounts 188 attached to the rearward end portion 110 of the upper frame structure 102. Each of the forward mounts 186 comprises a lower member 190 attached to the upper frame structure 102 and an upper member 192 attached to the lower member 190, as shown in FIG. 11. Each of the rearward mounts 188 comprises a connector 194 and three connecting members 196, as shown in FIG. 12. Each of the connecting members 196 has a first end 198 connected to the connector 194 and a second end 120 attached to the upper frame structure 102.

At least one of the connecting members 196 is in the form of a turnbuckle to allow a user to move the connector 194 relative to the upper frame structure 102. The stabilisation mounts 184 are formed from aluminium such as 6061-T6 aluminium, for example, or the like.

Figure 13:
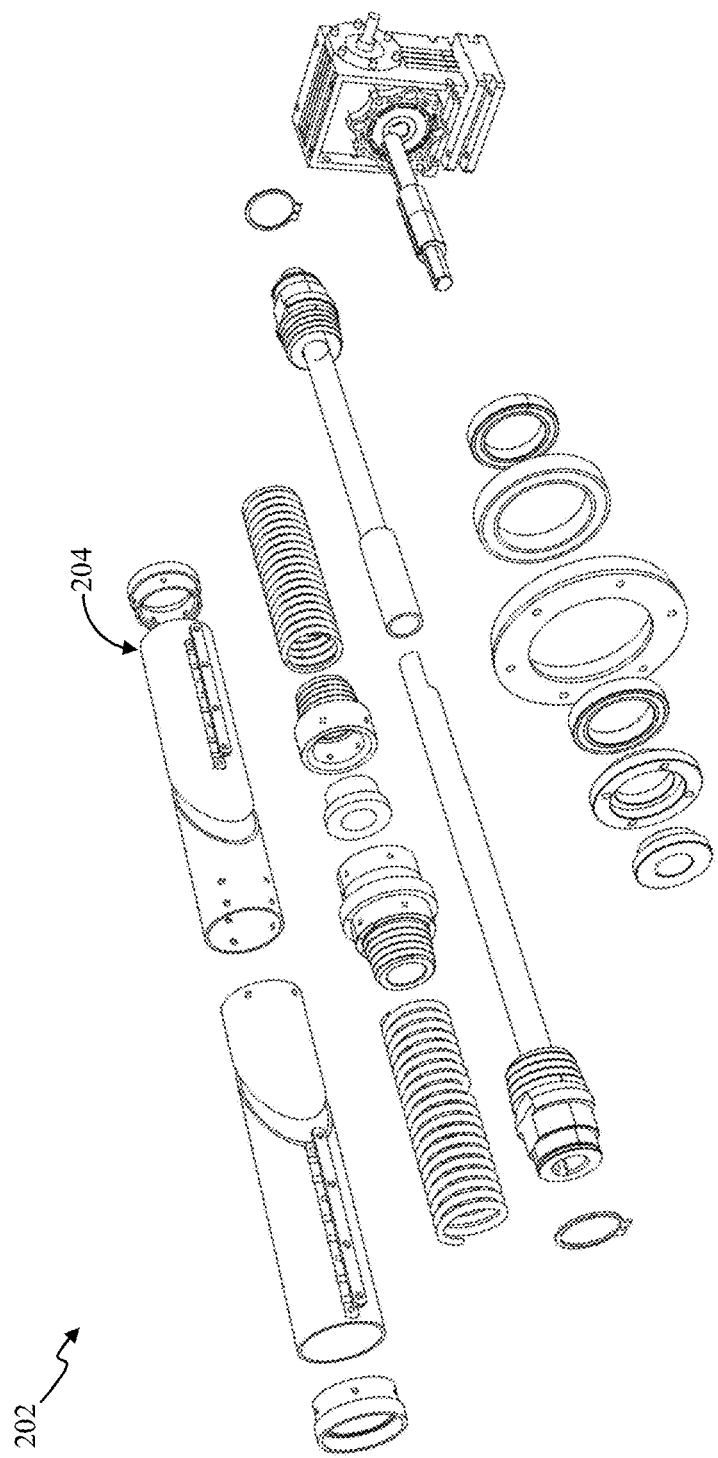
FIG. 13 is an exploded view of a retraction system of the tank assembly of FIG. 1.

Moreover, the tank assembly 10 comprises a retraction system 202 having a coil spring mechanism 204 (FIG. 13) connected to the upper frame structure 102 and a pulley system (not shown) operatively connected to the coil spring mechanism 204 and the lower frame structure 104.

Figure 14:
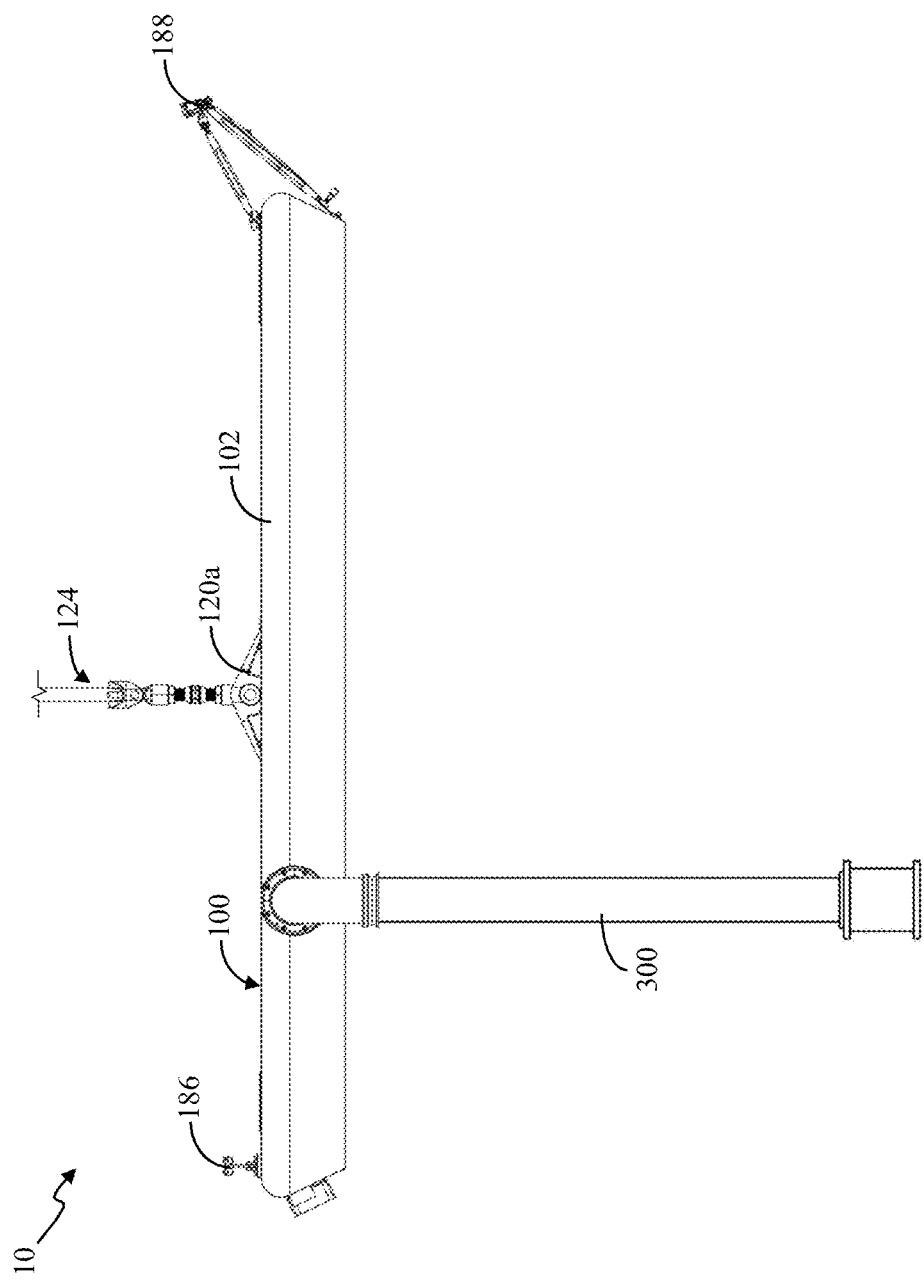
FIG. 14 is a side view of the tank assembly of FIG. 1, with the lower frame structure of the tank assembly being in a first retracted position.
Figure 15:
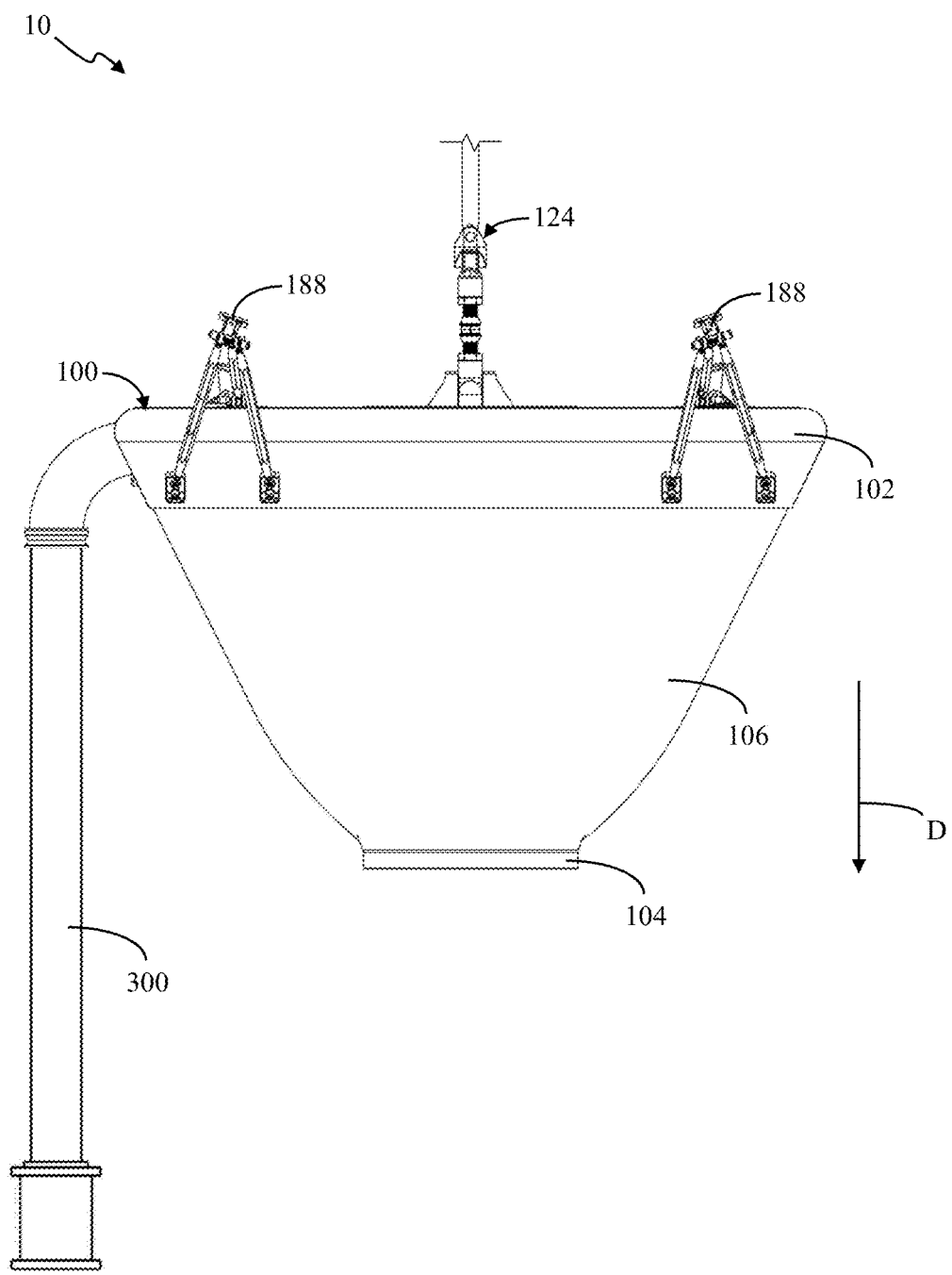
FIG. 15 is a rear view of the tank assembly of FIG. 1.

The lower frame structure 104 is moveable between a first retracted position and a second extended position. In the first retracted position, as shown in FIG. 14, the lower frame structure 104 is substantially within or adjacent the upper frame structure 102 and the flexible bag 106 is collapsed within the upper frame structure 102. The coil spring mechanism 204 of the retraction system 202 biases the lower frame structure 104 to the first retracted position. As liquid or other substances is introduced into the retractable tank 100 via a flexible inlet hose 300, the flexible bag 106 expands to define a volume therein for storing the liquid or other substances. The weight of the liquid or other substances in the flexible bag 106 causes the lower frame structure 104 to move by gravity to the second extended position in the direction D, as shown in FIG. 12. In the second extended position, the lower frame structure 104 is displaced downwardly from the upper frame structure 102. The extent of downward displacement of the lower frame structure 104 from the upper frame structure 102 is dependent on the volume of liquid or other substances stored in the flexible bag 106. Downward displacement of the lower frame structure 104 relative to the upper frame structure 102 also causes tension in the coil spring mechanism 204 of the retraction system 202. In this embodiment, the volume of the flexible bag 106 is about 4,250 litres (1,122 US gallons) when the flexible bag 106 is fully expanded. The plurality of openings 116 in the upwardly-facing surface 112 allows for any overflow of liquid or other substances.

Figure 16:
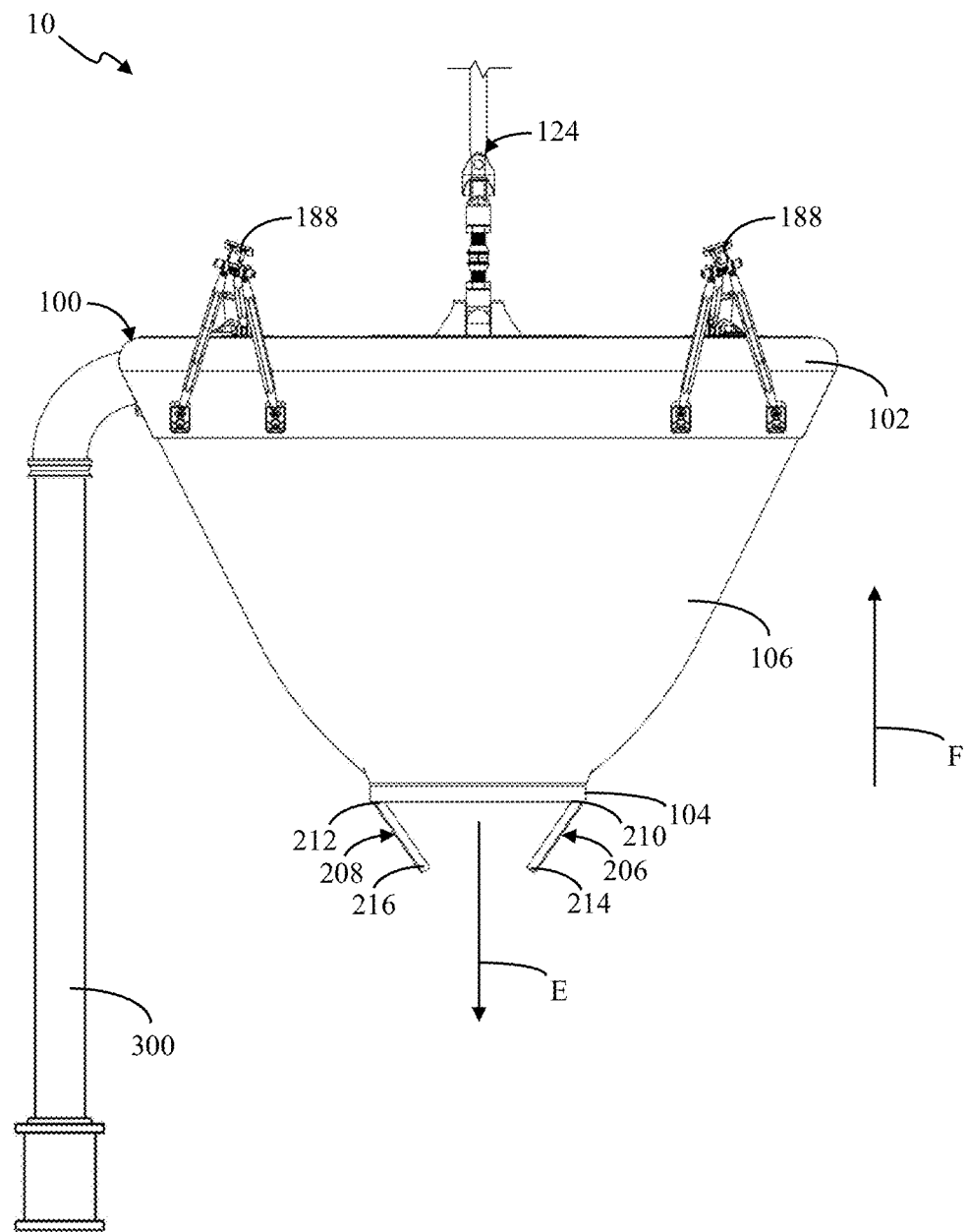
FIG. 16 is a rear view of the tank assembly of FIG. 1, with bomb doors open.

With reference to FIG. 16, the tank assembly further comprises two bomb doors 206, 208 that are disposed at or adjacent the lower frame structure 104 for controlling the amount of liquid or other substances to be released from the flexible bag 106. Each of the bomb doors 206, 208 comprises a first end 210, 212 pivotably attached to the lower frame structure 104 and a second opposed free end 214, 216. The bomb doors 206, 208 are pneumatically-operated via a controller (not shown). Each of the bomb doors 206, 208 is movable between a closed position in which the free end 214, 216 is at or substantially adjacent the lower frame structure 104, and an open position in which the free end 214, 216 is displaced downwardly from the lower frame structure 104 to allow the liquid or other substances to be released by gravity from the flexible bag 106. In some embodiments, the bomb doors 206, 208 may be controlled individually or simultaneously by the controller to provide various release patterns depending on fire suppression requirements. For example, the controller may provide Full Open, ½ Open, ⅓ Open or ¼ Open modes. Additionally or optionally, the controller may also provide a Full Open failsafe mode, in which the bomb doors 206, 208 remain open to release all of the liquid or other substances stored in the flexible bag 106 in the event of any electrical faults or an emergency.

When either of the bomb doors 206, 208 are in the open position and the liquid or other substances is released from the flexible bag 106 in the direction E, the lower frame structure 104 automatically moves upwards in the direction F towards the first retracted position due to the bias of the tension in the coil spring mechanism 204. It will be appreciated that the lower frame structure 104 will remain displaced from the upper frame structure 102 so long as liquid or other substances remain in the flexible bag 106.

Figure 17:
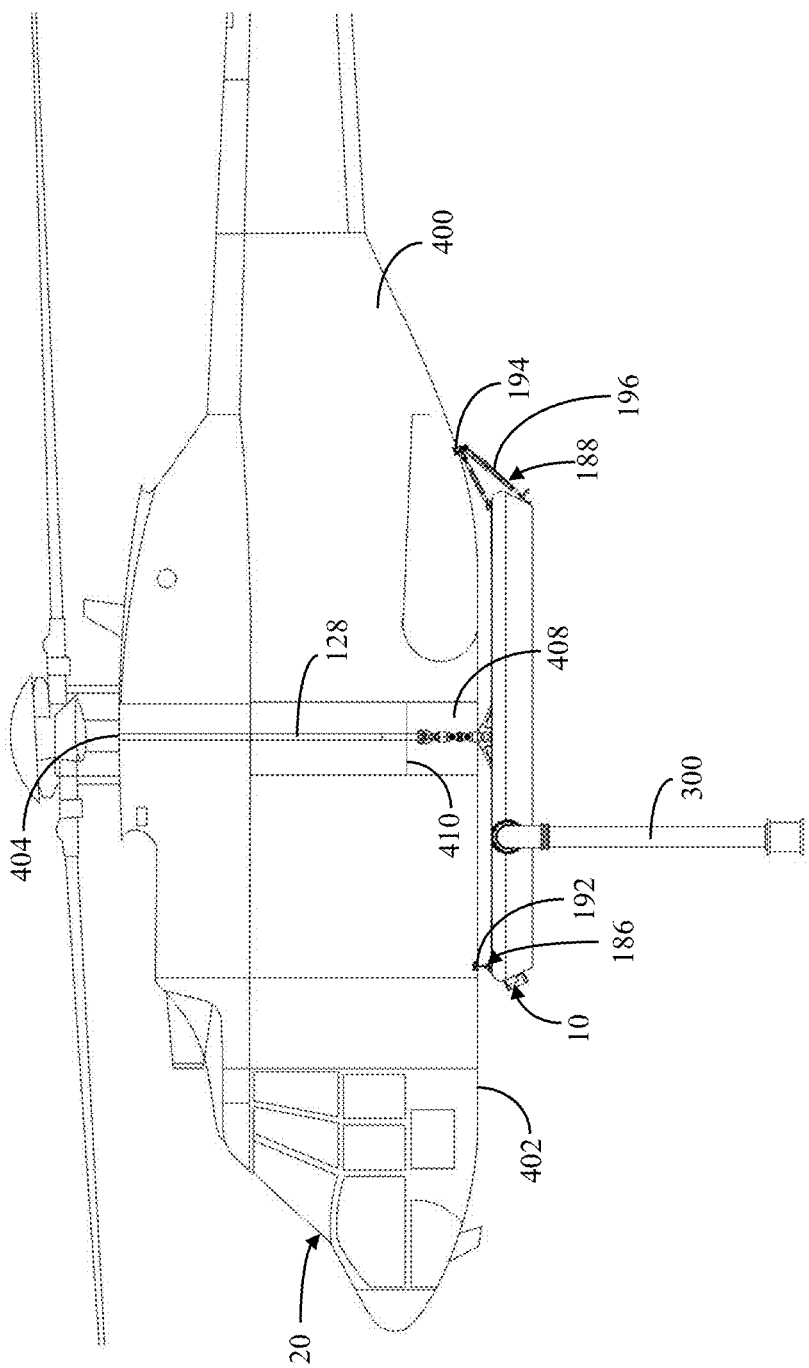
FIG. 17 is a side view of an embodiment of a helicopter in the air with the tank assembly of FIG. 1 attached thereto and the attachment mechanism of FIG. 4 shown, the lower frame structure of the tank assembly being in the first retracted position.
Figure 18:
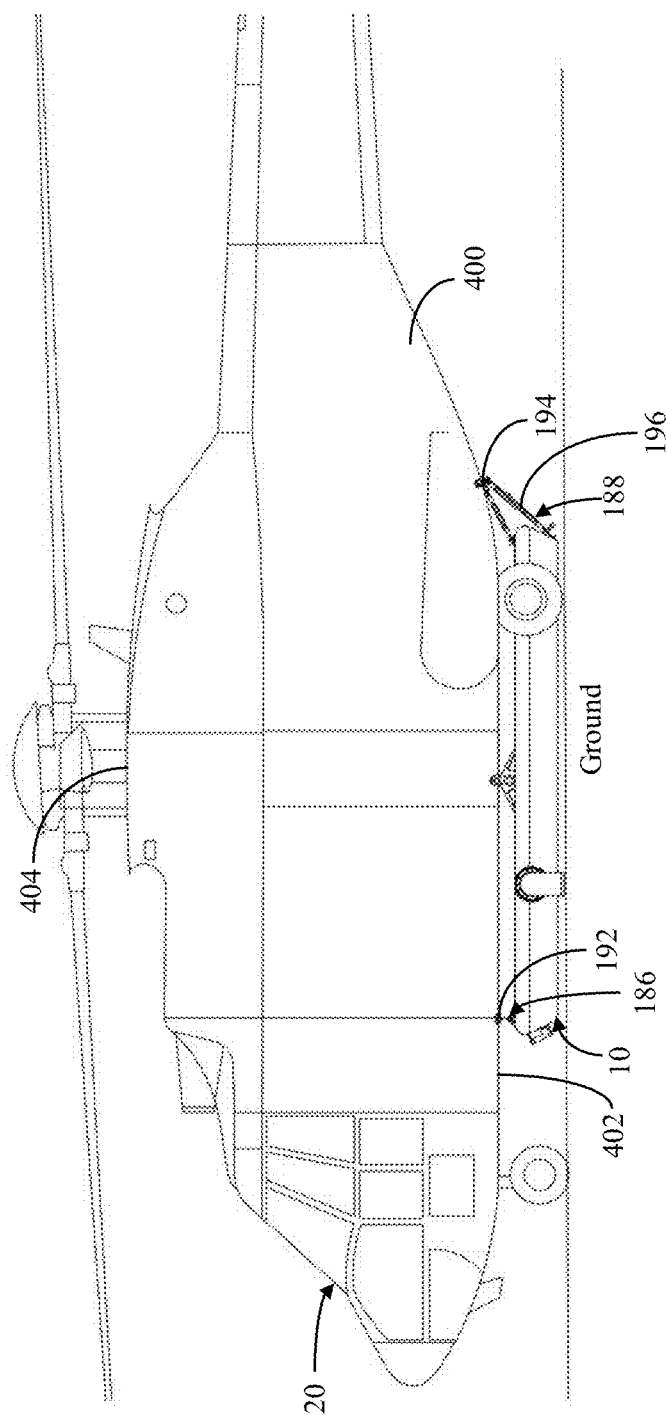
FIG. 18 is a side view of the helicopter of FIG. 17 on the ground.
Figure 19:
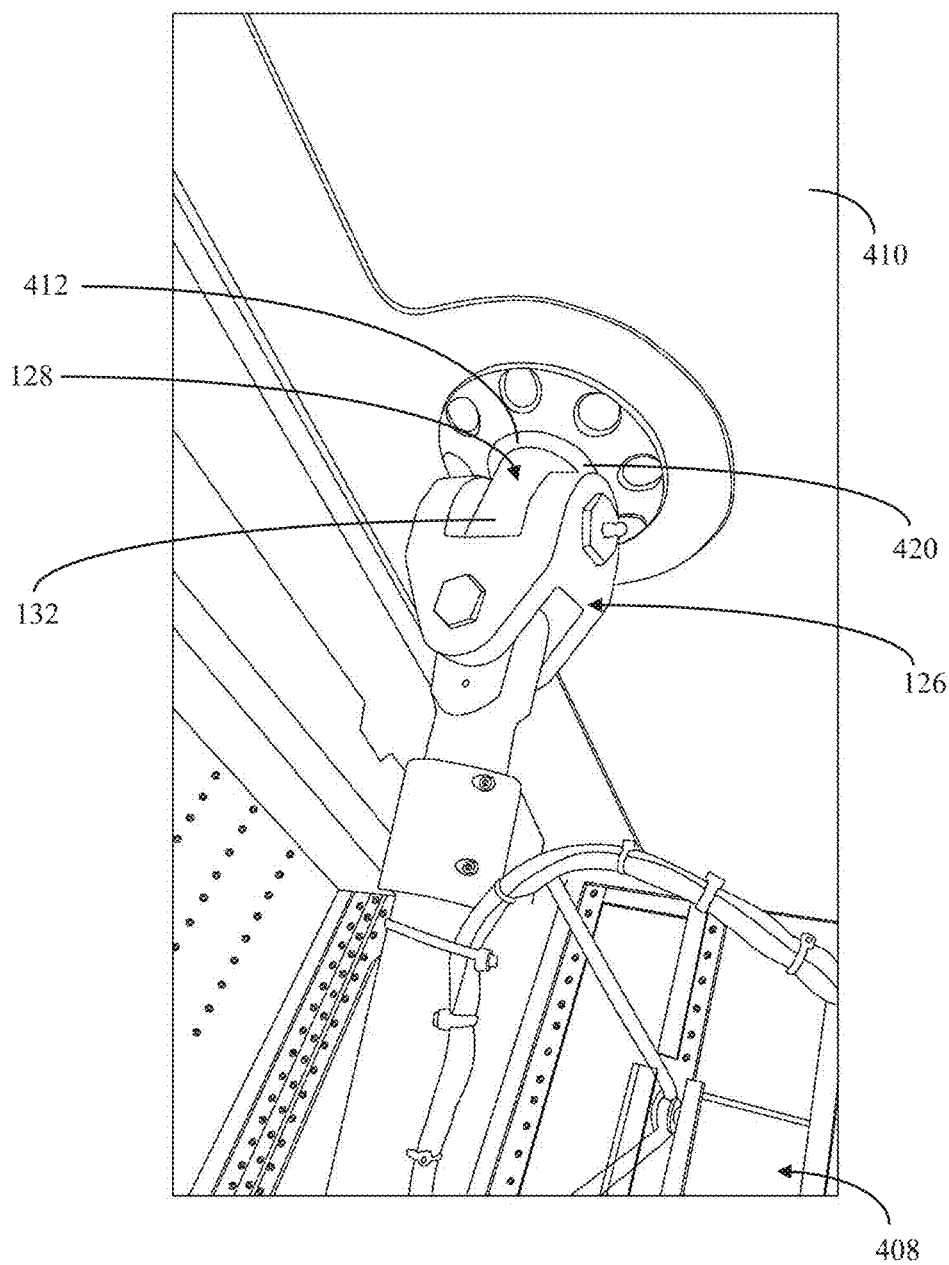
FIG. 19 is a bottom perspective view of a recess in the underside of the fuselage of the helicopter of FIG. 17.

FIGS. 17 and 18 show an embodiment of a helicopter 20 with the tank assembly 10 attached thereto. The helicopter 20 may be a Super Puma helicopter such as, for example, the Eurocopter AS332, and Airbus H215 and H225 models. The helicopter 20 comprises a fuselage 400 with an underside 402, a main rotor transmission 404 disposed at the top of the fuselage 400, and a cabin compartment 406. The underside 402 of the fuselage 400 comprises a recess 408 with a downwardly-facing surface 410, as shown in FIG. 19.

Figure 20:
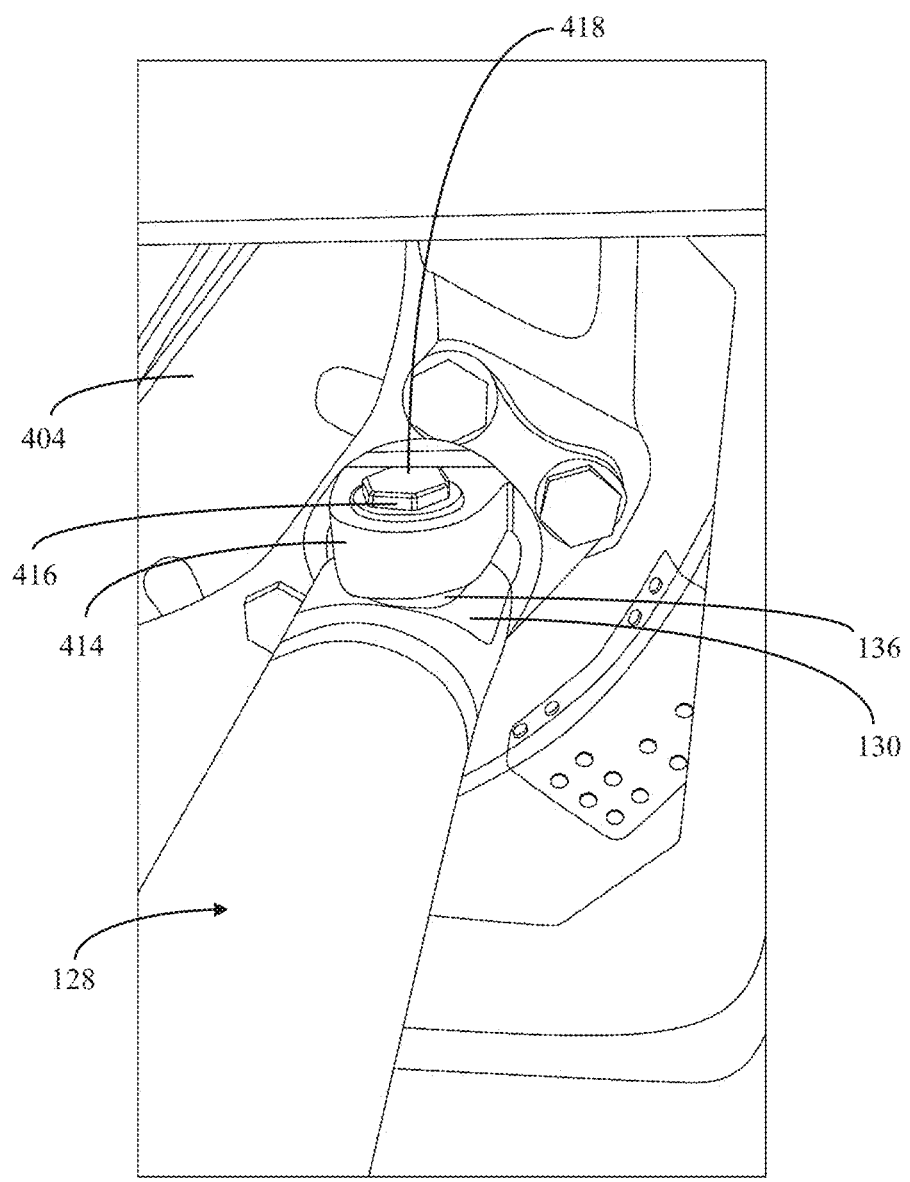
FIG. 20 is a bottom perspective view of a main rotor transmission of the fuselage of the helicopter of FIG. 17.

Turning now to FIG. 20, the main rotor transmission 404 comprises a downwardly extending mounting lug 414 with an aperture 416. The attachment mechanism 124 is engaged with the main rotor transmission 404 to suspend therefrom. In this regard, the upper end portion 130 of the rod 128 is positioned adjacent the mounting lug 414 such that the aperture 136 of the upper end portion 130 and the aperture 416 of the mounting lug 414 are aligned. A fastener 418 in the form of a self-locking pin extends through the aperture 136 of the upper end portion 130 and the aperture 416 of the mounting lug 414, thereby fixedly attaching the rod 128 to the main rotor transmission 404. It will be appreciated that the majority of the load of the tank assembly 10 will be suspended from the main rotor transmission 404.

Figure 21:
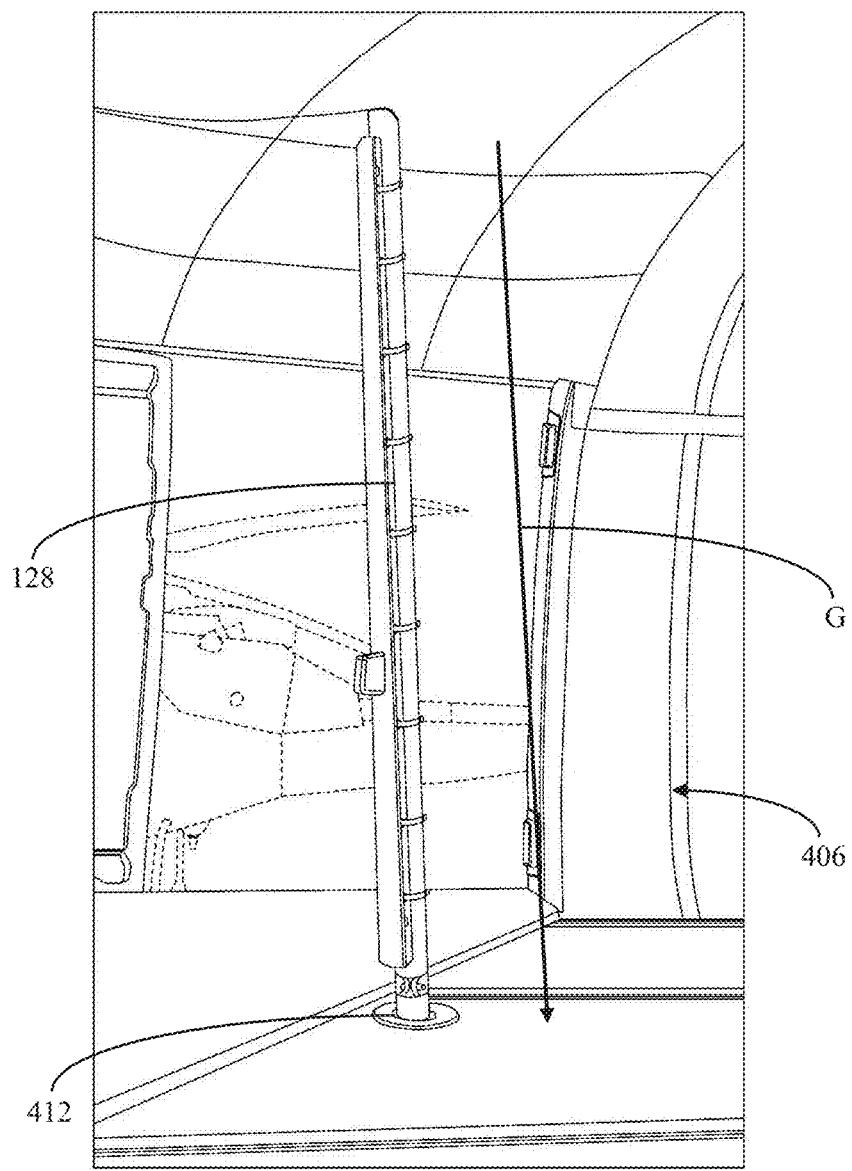
FIG. 21 is a side view of a cabin compartment of the helicopter of FIG. 17.

The rod 128 extends downwardly from the main rotor transmission 404 through the cabin compartment 406 (see FIG. 21) in a direction G, and through the opening 412 (see FIG. 19) such that the aperture 136 of the lower end portion 132 of the rod 128 is disposed in the recess 408. The opening 412 is positioned below the main rotor transmission 404 such that the direction G is substantially perpendicular to the downwardly-facing surface 410. A bearing 420 is also disposed in the opening 412 to limit movement and reduce friction between the rod 128 and the underside 402 of the fuselage 400.

The upper member 192 of each forward mount 186 and the connector 194 of each rearward mount 188 are attached, by way of bolts, for example, to the underside 402 of the helicopter 20, thereby securing the tank assembly 10 to the helicopter 20. To facilitate attachment of the tank assembly 10 to the helicopter 20, a user can move the connectors 194 of the rearward mounts 188 relative to the upper frame structure 102 by manipulating the connecting members 196 and adjust the distance C between the neck and tail connectors 148, 150 by manipulating the rotatable body 176. Each of the forward mounts 186 can also be adjusted by moving the upper member 192 relative to the lower member 190 to facilitate attachment of the tank assembly 10 to the helicopter 20.

The controller for pneumatically-operating the bomb doors 206, 208 is located onboard the helicopter 20, specifically in the cockpit, to allow a pilot of the helicopter 20 to control the release of liquid or other substances stored in the flexible bag 106.

The embodiments described above has numerous advantages. For example, the tank assembly 10 provides a simple and effective retrofitting solution for improving the firefighting capabilities of Super Puma helicopters without requiring significant and expensive modifications to be made to the helicopters 20. By suspending the tank assembly 10 from the main rotor transmission 404 via the attachment 124, the helicopter 20 is able to support the downward load of the tank assembly 10 with the fully expanded flexible bag 106.

The tank assembly 10 is also easy to manufacture and can be easily attached to, and removed from, the helicopter 20. Further, the tank assembly 10 is designed such that it occupies minimal real-estate externally of the helicopter 20, thus not affecting the maneuverability and performance of the helicopter 20. For example, as shown in FIG. 18, the lower frame structure 104 is maintained in the first retracted position so that the retractable tank 100 does not obstruct ground movement of the helicopter 20, and the lower frame structure 104 is moveable to the second extended position to maximise the capacity of the flexible bag 106 when the helicopter 20 is airborne. Fitting the tank assembly 10 external to the helicopter 20 also allows the cargo compartment 406 of the helicopter 20 to be used for other purposes such as transporting persons or cargo.

Further still, the retraction system 202 may be accessed externally by a user for adjustment and servicing via the plurality of openings 118 whilst the tank assembly 10 is attached to the helicopter 20, thus not requiring the tank assembly 10 to be removed from the helicopter 20. Moreover, the funnel shape of the expanded flexible bag 106 increases the head pressure of retractable tank 100 to allow a more effective canopy penetration of the released liquid or other substances for extinguishing fires.

Using pneumatic systems to operate the bomb doors 206, 208 in the above embodiments also provides advantages over hydraulic systems. For example, in hydraulic systems, hydraulic pressures may continually produce errors in the electronics of the tank assembly 10 as constant minor changes in hydraulic pressure limits may cause excessive traffic between solenoids of the tank assembly 10, hydraulic pressure sensors and pilot control systems. These problems may be overcome or ameliorated by using pneumatic systems, rather than hydraulic system, to operate the bomb doors 206, 208.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A tank assembly for a helicopter, the tank assembly comprising:
   a retractable tank for storing liquid or other substances, the retractable tank comprising an upper frame structure; and
   an attachment mechanism comprising:
      a linking assembly having a head connector, a tail connector attached to the upper frame structure, and an adjustment mechanism disposed between the head connector and the tail connector, the adjustment mechanism being rotatably manipulable to adjust a distance between the head connector and the tail connector; and
      a rod pivotably attached to the head connector of the linking assembly and extending upwardly therefrom to an upper end portion, the upper end portion of the rod being configured to attach to a main rotor transmission of the helicopter to suspend therefrom.

2. The tank assembly according to claim 1, wherein the head connector is a gimbal head defining an aperture, and wherein the rod has a lower end portion defining an aperture.

3. The tank assembly according to claim 2, further comprising a fastener for securing the gimbal head to the rod, wherein the aperture of the gimbal head and the aperture of the lower end portion of the rod are aligned and fixed by the fastener.

4. The tank assembly according to claim 1, further comprising one or more stabilisation mounts attached to the upper frame structure and configured to attach to an underside of the fuselage of the helicopter.

5. The tank assembly according to claim 4, wherein the upper frame structure has a forward end portion and a rearward end portion, and
wherein the one or more stabilisation mounts comprises two forward mounts attached to the forward end portion and two rearward mounts attached to the rearward end portion.

6. The tank assembly according to claim 5, wherein the upper frame structure has a centre portion between the forward and rearward end portions, and wherein the attachment mechanism is attached to the centre portion.

7. The tank assembly according to claim 1, wherein the retractable tank further comprises a moveable lower frame structure and a flexible bag connected to the upper and lower frame structures, and
wherein the lower frame structure is moveable between a first retracted position in which the lower frame structure is substantially within or adjacent the upper frame structure, and a second extended position in which the lower frame structure is spaced from the upper frame structure such that a volume is defined within the flexible bag for storing the liquid or other substances.

8. The tank assembly according to claim 7, wherein the lower frame structure is biased to the first retracted position and moves towards the second extended position in response to the amount of liquid or other substance in the volume of the flexible bag.

9. The tank assembly according to claim 8, wherein the lower frame structure is biased to the first retracted position by a retraction system engaged with the upper and lower frame structures.

10. A helicopter comprising:
a fuselage having an underside;
a main rotor transmission; and
a tank assembly comprising:
a retractable tank for storing liquid or other substances, the retractable tank comprising an upper frame structure; and
an attachment mechanism comprising:
a linking assembly having a head connector, a tail connector attached to the upper frame structure, and an adjustment mechanism disposed between the head connector and the tail connector, the adjustment mechanism being rotatably manipulable to adjust a distance between the head connector and the tail connector; and
a rod pivotably attached to the head connector of the linking assembly and extending upwardly therefrom to an upper end portion, the upper end portion of the rod being attached to the main rotor transmission to suspend therefrom.

11. The helicopter according to claim 10, wherein the head connector is a gimbal head defining an aperture, and wherein the rod has a lower end portion defining an aperture.

12. The helicopter according to claim 11, wherein the tank assembly further comprises a fastener for securing the gimbal head to the rod, wherein the aperture of the gimbal head and the aperture of the lower end portion of the rod are aligned and fixed by the fastener.

13. The helicopter according to claim 10, wherein the tank assembly further comprises one or more stabilisation mounts attached to the upper frame structure and the underside of the fuselage.

14. The helicopter according to claim 13, wherein the upper frame structure has a forward end portion and a rearward end portion, and
wherein the one or more stabilisation mounts comprises two forward mounts attached to the forward end portion and two rearward mounts attached to the rearward end portion.

15. The helicopter according to claim 14, wherein the upper frame structure has a centre portion between the forward and rearward end portions, and wherein the attachment mechanism is attached to the centre portion.

16. The helicopter according to claim 10, wherein the main rotor transmission defines an aperture, and the upper end portion of the rod defines an aperture.

17. The helicopter according to claim 16, further comprising a fastener for securing the rod to the main rotor transmission, wherein the aperture of the upper end portion of the rod and the aperture of the main rotor transmission are aligned and secured by the fastener.

18. The helicopter according to claim 10, wherein the helicopter is a Eurocopter AS332, Airbus H215 or Airbus H225.

* * * * *